United States Patent
Zhu et al.

(10) Patent No.: US 7,358,287 B2
(45) Date of Patent: Apr. 15, 2008

(54) FLAME RETARDANT POLYCARBONATE COMPOSITION

(75) Inventors: Jin Zhu, Medina, OH (US); Nishant Negandhi, Medina, OH (US)

(73) Assignee: Ovation Polymer Technology and Engineered Materials, Inc., Cleveland, OH (US)

( * ) Notice: Subject to any disclaimer, the term of this patent is extended or adjusted under 35 U.S.C. 154(b) by 408 days.

(21) Appl. No.: 11/141,276

(22) Filed: May 31, 2005

(65) Prior Publication Data

US 2006/0270768 A1    Nov. 30, 2006

(51) Int. Cl.
*C08K 5/523*    (2006.01)

(52) U.S. Cl. .................. 524/127; 524/140; 524/141

(58) Field of Classification Search ........... 524/127, 524/140–141
See application file for complete search history.

(56) References Cited

U.S. PATENT DOCUMENTS

| | | | |
|---|---|---|---|
| 4,883,835 A | 11/1989 | Buysh et al. ............... 524/504 |
| 4,983,658 A | 1/1991 | Kress et al. ............... 524/141 |
| 6,437,029 B1 | 8/2002 | Lim et al. ................... 524/97 |
| 6,630,525 B2 | 10/2003 | Cella et al. ................. 524/100 |
| 6,649,677 B2 | 11/2003 | Jaatinen et al. ............. 524/227 |
| 6,956,073 B2* | 10/2005 | Takagi et al. ............... 524/127 |
| 7,045,555 B2* | 5/2006 | Takagi .......................... 521/48 |
| 2003/0191245 A1 | 10/2003 | Nordera et al. ............. 525/100 |
| 2004/0034132 A1 | 2/2004 | Campbell et al. ........... 524/189 |
| 2004/0192814 A1 | 9/2004 | Yang et al. .................. 524/115 |
| 2004/0220302 A1 | 11/2004 | Saegusa et al. ............. 524/161 |

* cited by examiner

*Primary Examiner*—Peter Szekely
(74) *Attorney, Agent, or Firm*—Alvin T. Rockhill; Edwin A. Sisson

(57) ABSTRACT

The invention relates to a flame retardant polycarbonate composition which is comprised of a polycarbonate, a phosphoric acid ester, a functionalized acrylic polymer, and an alkyl methacrylate-diene-vinyl aromatic terpolymer, wherein the polycarbonate is present in the composition in an amount of at least about 85 weight percent, wherein the phosphoric acid ester is present at a level which is within the range of about 1 weight percent to about 12 weight percent, wherein the functionalized acrylic polymer is present at a level which is within the range of about 0.5 weight percent to about 4.5 weight percent, and wherein the alkyl methacrylate-diene-vinyl aromatic terpolymer is present at a level which is within the range of about 0.5 weight percent to about 4.5 weight percent, with the proviso that the sum of the amount of the functionalized acrylic polymer and the alkyl methacrylate-diene-vinyl aromatic terpolymer present in the composition does not total more than 5 weight percent.

19 Claims, No Drawings

FLAME RETARDANT POLYCARBONATE COMPOSITION

FIELD OF THE INVENTION

This invention relates to a flame retardant polycarbonate composition having good mechanical properties. This flame retardant polycarbonate composition is comprised of a polycarbonate, a phosphoric acid ester, a functionalized acrylic polymer, an alkyl methacrylate-diene-vinyl aromatic terpolymer, and an anti-dripping agent.

BACKGROUND OF THE INVENTION

Polycarbonate resin is a widely used engineering plastic due to its excellent mechanical properties, heat stability, and transparency. It is desirable or necessary for the polycarbonate resin to have good flame retardant characteristics when it is used in electric or electronic products, automobile parts, office equipment, and a variety of other applications. However, the incorporation of flame retardants into polycarbonates typically leads to compromised mechanical properties, reduced impact strength, and a lower level of heat stability.

In order to obtain flame retardant polycarbonate resin, a halogen-containing flame retardant was used in U.S. Pat. No. 4,983,658 and U.S. Pat. No. 4,883,835. However, halogen-containing flame retardants will be restricted to use due to their unfriendly effect on environment. Since a siloxane-containing polycarbonate copolymer with good flame retardancy was successfully developed by GE Plastics (see U.S. Pat. No. 6,630,525), a silicone compound was also used as flame retardant for polycarbonate from United States Patent Application 20030191245 and United States Patent Application 20040220302. Phosphoric acid esters are commonly used in polycarbonate resins (see United States Patent Applications 20020077392, 20040192814 and 20040034132). In order to compensate for the impact strength loss caused by the addition of the phosphoric acid flame retardant, the impact modifier rubber was added. The rubber includes acrylonitrile-butadiene-styrene (ABS), ethylene-propylene-diene (EPDM), ethylene-propylene rubber, etc. These rubbers greatly improve the impact strength of polycarbonate resin, but they lead to low heat stability.

SUMMARY OF THE INVENTION

In this invention, the functionalized acrylic polymers are used together with impact modifier rubbers to improve the compatibility between rubber and polycarbonate, and reduce the amount of impact modifiers (below 5 wt. %) and flame retardants (below 10%). The new polycarbonate resin exhibits great flame retardancy (UL 94 V-0) and maintains high mechanical properties and heat stability.

The present invention also relates to a flame retardant polycarbonate composition which is comprised of a polycarbonate, a phosphoric acid ester, a functionalized acrylic polymer, an alkyl methacrylate-diene-vinyl aromatic terpolymer, and an anti-dripping agent, wherein the polycarbonate is present in the composition in an amount of at least about 85 weight percent, wherein the phosphoric acid ester is present at a level which is within the range of about 1 weight percent to about 12 weight percent, wherein the functionalized acrylic acid polymer is present at a level which is within the range of about 0.5 weight percent to about 4.5 weight percent, and wherein the alkyl methacrylate-diene-vinyl aromatic terpolymer is present at a level which is within the range of about 0.5 weight percent to about 4.5 weight percent, with the proviso that the sum of the amount of the functionalized acrylic acid polymer and the alkyl methacrylate-diene-vinyl aromatic terpolymer present in the composition does not total more than 5 weight percent.

DETAILED DESCRIPTION OF THE INVENTION

The flame retardant polycarbonate compositions of this invention typically contain at least about 85 weight percent of the polycarbonate and will typically contain 85 weight percent to 98 weight percent of the polycarbonate, based upon the total weight of the flame retardant polycarbonate composition. The flame retardant polycarbonate compositions of this invention will also normally contain 1 weight percent to 12 weight percent of a phosphoric acid flame retardant and will preferably contain 2 weight percent to 10 weight percent of the phosphoric acid flame retardant. The flame retardant polycarbonate composition will most preferably contain from 5 to 9 weight percent of the phosphoric acid flame retardant.

The flame retardant polycarbonate compositions of this invention will also contain about 0.5 weight percent to 4.5 weight percent of an alkyl methacrylate-diene-vinyl aromatic terpolymer and 0.5 weight percent to 4.5 weight percent of a functionalized acrylic polymer. The alkyl methacrylate-diene-vinyl aromatic terpolymer will preferably be present in an amount which is within the range of 2 weight percent to 3 weight percent and the functionalized acrylic polymer will preferably be present in an amount which is within the range of 1 weight percent to 2 weight percent. The total amount of the functionalized acrylic polymer and the alkyl methacrylate-diene-vinyl aromatic terpolymer must be maintained at a level of no more than 5 weight percent or the flexural modulus, heat distortion temperature, and flammability rating of the flame retardant composition will be compromised. The flame retardant polycarbonate compositions of this invention will normally also contain from 0.05 weight percent to 0.5 weight percent of an anti-dripping agent, such as poly(tetrafluoroethylene), and will preferably contain 0.1 weight percent to 0.3 weight percent of the anti-dripping agent. The polycarbonate (PC) that is used in the practice of this invention is typically poly (bisphenol A carbonate).

The functionalized acrylic polymer will generally be of the formula E/X/Y, where E is about 55-75%, X is about 15-35%, and Y is about 2-15% by weight of the compatibilizing ethylene-acrylic copolymer, and E is ethylene polymer, X is an $\alpha,\beta$-ethylenically unsaturated monomer derived from at least one of alkylacrylate, alkylmethacrylate, alkyl vinyl ether, carbon dioxide, sulfur dioxide, or mixtures thereof, where the alkyl groups contain 1-12 carbon atoms, such as vinyl acetate, methylacrylate, butylacrylate, and methyl vinyl ether. X can, for example, be a moiety derived from at least one of alkyl acrylate, alkyl methacrylate, alkyl vinyl ether, carbon monoxide, sulfur dioxide, or mixtures thereof. More specifically, X can, for example, consist of 0-35 weight percent of a moiety derived from at least one alkyl acrylate, alkyl methacrylate, or mixtures thereof where the alkyl groups contain 1-8 carbon atoms. Y is an $\alpha,\beta$-ethylenically unsaturated monomer containing a reactive group, such as epoxide, maleic anhydride, isocyanate, or oxazoline, for example, that forms a covalent bond with said first polymeric component. In one preferred embodiment, Y is selected from the group consisting of glycidyl methacrylate and glycidyl acrylate, maleic anhydride, and isocyanatoethylmethacrylate. It is normally preferred for the functionalized acrylic polymer to be functionalized with an epoxy group.

The functionalized acrylic polymer will typically contain repeat units that are derived from an acrylate monomer of the structural formula:

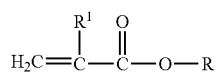

wherein R represents a hydrogen atom, an alkyl group containing from 1 to about 8 carbon atoms, or a moiety containing an epoxy group or a silane containing functional group, and wherein $R^1$ represents a hydrogen atom or an alkyl group containing from 1 to about 8 carbon atoms. Some representative examples of monomers that can be used include methyl methacrylate, butyl acrylate, and cyclic dimethylsiloxane. In many cases, R will represent an alkyl group containing from 1 to 4 carbon atoms. The moiety containing an epoxy group will typically be of the structural formula:

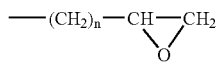

wherein n represents an integer from 1 to about 6. In most cases, n will represent 1.

The functionalized acrylic polymer will preferably be a terpolymer of ethylene, methylmethacrylate, and glycidyl methacrylate. Such terpolymers will typically have a melting point which is within the range of 55° C. to 70° C. and will contain from about 45 weight percent to about 89 weight percent ethylene, 10 weight percent to 40 weight percent methylmethacrylate, and 1 weight percent to 15 weight percent glycidyl methacrylate. It is normally more typical for the functionalized acrylic polymer to contain from about 60 weight percent to about 74 weight percent ethylene, 20 weight percent to 30 weight percent methylmethacrylate, and 6 weight percent to 10 weight percent glycidyl methacrylate.

The alkyl methacrylate-diene-styrene terpolymer will contain repeat units that are derived from an alkyl-methacrylate monomer, a conjugated diolefin monomer, such as 1,3-butadiene or isoprene, and a vinyl aromatic monomer, such as styrene or α-methyl styrene. The alkyl methacrylate monomer will be of the structural formula:

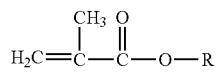

wherein R represents a hydrogen atom or an alkyl group containing from 1 to about 8 carbon atoms. R will typically represent an alkyl group containing from 1 to about 4 carbon atoms. Methyl methacrylate and ethyl methacrylate are representative examples of highly preferred alkyl methacrylate monomers. Polyfluorocarbon compounds such as PTFE may be incorporated into the polycarbonate compositions of this invention, as well as pigments, thermal stabilizers, UV stabilizers, polymeric lubricants, carboxylic acid salt lubricants and antioxidants.

The alkyl methacrylate-diene-styrene terpolymer will typically be a block terpolymer which is comprised of an alkyl methacrylate block, a diene monomer block, and a styrene block. Such block terpolymers will typically be comprised of a methyl methacrylate block, a butadiene block, and a styrene block. The styrene will typically be present at a level which is within the range of about 5 weight percent to about 25 weight percent, the methylmethacrylate will typically be present at a level which is within the range of about 5 weight percent to about 25 weight percent, and the butadiene will typically be present at a level which is within the range of about 50 weight percent to about 90 weight percent. The block terpolymer will more typically contain 10 weight percent to 15 weight percent styrene, 10 weight percent to 15 weight percent methylmethacrylate, and 70 weight percent to 80 weight percent butadiene.

The phosphoric acid ester will typically be an aromatic phosphate oligomer. The aromatic phosphate oligomer can be bisphenol A diphenylphosphate, resorcinol diphenylphosphate or 1,3-phenylene-bis(dixylenyl phosphate). It is normally preferred for the aromatic phosphate oligomer to be bisphenol A diphenylphosphate or resorcinol diphenylphosphate. The phosphoric acid ester will typically be present in the flame retardant polycarbonate composition at a level which is within the range of about 1 weight percent to about 12 weight percent. The phosphoric acid ester will more typically be present at a level which is within the range of 2 weight percent to 10 weight percent, with it being preferred for the phosphoric acid ester to be present at a level which is within the range of 5 weight percent to 9 weight percent.

The reactive extrusion process for preparation of the flame retardant polycarbonate formulation will normally comprise adding a blend mixture of the polycarbonate, the phosphoric acid ester, the functionalized acrylic polymer and the alkyl methyacrylate-diene-vinyl aromatic terpolymer, along with the anti-dripping agent and, optionally, stabilizers, pigments, colorants, and processing aids as a single feed into the feed hopper of a suitable mixing device for melt blending, such as a single or twin screw extruder or multiple mixing devices with controlled specific energy input via control of feed rate (15 to 95% torque), RPM (60 to 900 rpm), process temperature and residence time distribution. The specific energy input will typically be within the range of 0.3 to 0.55 kilowatt hours per kilogram and will more typically be within the range of 0.4 to 0.5 kilowatt hours per kilogram. It should be noted that the polycarbonate will typically be dried to a moisture content of no more than 0.05 weight percent before being utilized in the preparation of the flame retardant composition.

In an alternative embodiment of this invention, the flame retardant polycarbonate composition is formed by a reactive blending/extrusion process using split-feed technology, wherein in a twin or single screw extruder (extruder length of 36D to 52D, wherein D is the diameter of the extruder screw), the polycarbonate resin or mixture of resins thereof is premixed with the modifier mixture to be fed from the main feeder and the phosphoric acid ester are introduced into the toughened melt of polycarbonate anywhere at a downstream feed-port location at a distance of 8D to 30D, from the main feed throat of the extruder.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 85.35 parts of polycarbonate, 10 parts of FP-500 1,3-phenylene-bis(dixylenyl phosphate) from Amfine Chemical Corporation, 1.50 parts of Lotader® 8900 terpolymer of ethylene, methyl methacrylate and glycidyl methacrylate, 1.50 parts of Metablen® S 2001 copolymer of methyl methacrylate, butyl acrylate and dimethylsiloxane, 1 part of 4-7051 resin modifier silica from Dow Corning, 0.2 parts of Polyflon PTFE L-2 from Daikin, 0.24 parts of ELC-1010 tetrakis methylene (3,5-di-t-butyl-4-hydroxyhydrocinnamate) methane from Ed-Lynn Network Polymers, and 0.20 parts of Doverphos® S-9228 bis (2,4-dicumylphenyl)pentaerythritol diphosphite stabilizer. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 1.

TABLE 1

| Properties | Test Method | Units | Example 1 |
| --- | --- | --- | --- |
| Strain at Break | ASTM D638 | % | 66 |
| Tensile Strength at yield | ASTM D638 | MPa | 56.3 |
| Tensile Strength at Break | ASTM D638 | MPa | 61.4 |
| Tensile Modulus | ASTM D638 | MPa | 2037 |
| Flexural Modulus | ASTM D790 | MPa | 2804 |
| Flexural Strength | ASTM D790 | MPa | 98.9 |
| Notched Izod at 23° C. | ASTM D256 | KJ/m$^2$ | 18.9 |
| HDT at | ASTM D648 | ° C. | |
| 0.45 MPa | | | |
| 1.82 MPa | | | 110 |
| Flammability rating | UL94 (0.059 in) | — | V0 |

EXAMPLE 2

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 85.35 parts of polycarbonate, 10 parts of FP-500 1,3-phenylene-bis(dixylenyl phosphate) from Amfine Chemical Corporation, 1.50 parts of Lotader® 8900 terpolymer of ethylene, methyl methacrylate and glycidyl methacrylate, 1.50 parts of Metablen® S 2001 copolymer of methyl methacrylate, butyl acrylate and dimethylsiloxane, 1 part of SFR100 silicone fluid from GE Silicones, 0.2 parts of Polyflon PTFE L-2 from Daikin, 0.24 parts of ELC-1010 tetrakis methylene (3,5-di-t-butyl-4-hydroxyhydrocinnamate) methane from Ed-Lynn Network Polymers, and 0.20 parts of Doverphos® S-9228 bis (2,4-dicumylphenyl)pentaerythritol diphosphite stabilizer. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 2.

TABLE 2

| Properties | Test Method | Units | Example 2 |
| --- | --- | --- | --- |
| Strain at Break | ASTM D638 | % | 61 |
| Tensile Strength at yield | ASTM D638 | MPa | 53.8 |
| Tensile Strength at Break | ASTM D638 | MPa | 56.5 |
| Tensile Modulus | ASTM D638 | MPa | 1627 |
| Flexural Modulus | ASTM D790 | MPa | 2610 |
| Flexural Strength | ASTM D790 | MPa | 93.3 |
| Notched Izod at 23° C. | ASTM D256 | KJ/m$^2$ | 80.7 |
| HDT at | ASTM D648 | ° C. | |
| 0.45 MPa | | | |
| 1.82 MPa | | | 110 |
| Flammability rating | UL94 (0.059 in) | — | V0 |

EXAMPLE 3

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 83.35 parts of polycarbonate, 10 parts of FP-500 1,3-phenylene-bis(dixylenyl phosphate) from Amfine Chemical Corporation, 1.50 parts of Lotader® 8900 terpolymer of ethylene, methyl methacrylate and glycidyl methacrylate, 1.50 parts of Metablen® S 2001 copolymer of methyl methacrylate, butyl acrylate and dimethylsiloxane, 1 part of 4-7051 resin modifier silica from Dow Corning, 0.2 parts of Polyflon PTFE L-2 from Daikin, 2 parts of Bentone 107 from Elementis Specialty, 0.24 parts of ELC-1010 tetrakis methylene (3,5-di-t-butyl-4-hydroxyhydrocinnamate)methane from Ed-Lynn Network Polymers, and 0.20 parts of Doverphos® S-9228 bis(2,4-dicumylphenyl)pentaerythritol diphosphite stabilizer. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 3.

TABLE 3

| Properties | Test Method | Units | Example 3 |
| --- | --- | --- | --- |
| Strain at Break | ASTM D638 | % | 55 |
| Tensile Strength at yield | ASTM D638 | MPa | 55.7 |
| Tensile Strength at Break | ASTM D638 | MPa | 55.3 |
| Tensile Modulus | ASTM D638 | MPa | 2014 |
| Flexural Modulus | ASTM D790 | MPa | 3061 |
| Flexural Strength | ASTM D790 | MPa | 102.2 |
| Notched Izod at 23° C. | ASTM D256 | KJ/m$^2$ | 12.3 |
| HDT at | ASTM D648 | ° C. | |
| 0.45 MPa | | | 107 |
| 1.82 MPa | | | |
| Flammability rating | UL94 (0.059 in) | — | V0 |

EXAMPLE 4

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 84.35 parts of polycarbonate, 10 parts of FP-500 1,3-phenylene-bis(dixylenyl phosphate) from Amfine Chemical Corporation, 1.50 parts of Lotader® 8900 terpolymer of ethylene, methyl methacrylate and glycidyl methacrylate, 1.50 parts of Metablen® S 2001 copolymer of methyl methacrylate, butyl acrylate and dimethylsiloxane, 1 part of 4-7051 resin modifier silica from Dow Corning, 1 part of Bentone® 107 dispersible hectorite clay from Elementis Specialties, Inc., 0.2 parts of Polyflon PTFE L-2 from Daikin, 0.24 parts of ELC-1010 tetrakis methylene (3,5-di-t-butyl-4-hydroxyhydrocinnamate) methane from Ed-Lynn Network Polymers, and 0.20 parts of Doverphos® S-9228 bis (2,4-dicumylphenyl)pentaerythritol diphosphite stabilizer. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 4.

TABLE 4

| Properties | Test Method | Units | Example 4 |
| --- | --- | --- | --- |
| Strain at Break | ASTM D638 | % | 77 |
| Tensile Strength at yield | ASTM D638 | MPa | 54.2 |
| Tensile Strength at Break | ASTM D638 | MPa | 60.7 |
| Tensile Modulus | ASTM D638 | MPa | 1940 |
| Flexural Modulus | ASTM D790 | MPa | 2684 |
| Flexural Strength | ASTM D790 | MPa | 99.0 |
| Notched Izod at 23° C. | ASTM D256 | KJ/m$^2$ | 15 |
| HDT at | ASTM D648 | ° C. | |
| 0.45 MPa | | | 108 |
| 1.82 MPa | | | |
| Flammability rating | UL94 (0.059 in) | — | V0 |

EXAMPLE 5

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 94.1 parts of polycarbonate, 5 parts of FP-500 1,3-phenylene-bis(dixylenyl phosphate) from Amfine Chemical Corporation, 0.75 parts of Lotader® 8900 terpolymer of ethylene, methyl methacrylate and glycidyl methacrylate, 1.5 parts of Nitrimpact® 1300 methylmethacrylate-butadiene-styrene based rubbery modifier, 1 part of SFR100 silicone fluid from GE Silicones, 0.2 parts of Polyflon PTFE L-2 from Daikin, 0.24 parts of ELC-1010 tetrakis methylene (3,5-di-t-butyl-4-hydroxyhydrocinnamate)methane from Ed-Lynn Network Polymers, and 0.20 parts of Doverphos®V S-9228 bis(2,4-dicumylphenyl) pentaerythritol diphosphite stabilizer. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 5.

TABLE 5

| Properties | Test Method | Units | Example 5 |
| --- | --- | --- | --- |
| Strain at Break | ASTM D638 | % | 65 |
| Tensile Strength at yield | ASTM D638 | MPa | 52.1 |
| Tensile Strength at Break | ASTM D638 | MPa | 58.0 |
| Tensile Modulus | ASTM D638 | MPa | 1780 |
| Flexural Modulus | ASTM D790 | MPa | 2656 |
| Flexural Strength | ASTM D790 | MPa | 65.4 |
| Notched Izod at 23° C. | ASTM D256 | KJ/m$^2$ | 85.5 |
| HDT at | ASTM D648 | ° C. | |
| 0.45 MPa | | | 133 |
| 1.82 MPa | | | |

This composition did not prove to have adequate flame retardancy and its tensile strength at yield was low.

EXAMPLE 6

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 91.1 parts of polycarbonate, 2 parts of FP-500 1,3-phenylene-bis (dixylenyl phosphate) from Amfine Chemical Corporation, 0.75 parts of Lotader® 8900 terpolymer of ethylene, methyl methacrylate and glycidyl methacrylate, 1.5 parts of Nitrimpact® 1300 methylmethacrylate-butadiene-styrene based rubbery modifier, 1 part of Silicone fluid SFR100 from GE Silicones, 0.2 parts of Polyflon PTFE L-2 from Daikin, 0.24 parts of ELC-1010 tetrakis methylene (3,5-di-t-butyl-4-hydroxyhydrocinnamate)methane from Ed-Lynn Network Polymers, and 0.20 parts of Doverphos® S-9228 bis(2,4-dicumylphenyl)pentaerythritol diphosphite stabilizer. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 6.

TABLE 6

| Properties | Test Method | Units | Example 6 |
| --- | --- | --- | --- |
| Strain at Break | ASTM D638 | % | 30 |
| Tensile Strength at yield | ASTM D638 | MPa | 52 |
| Tensile Strength at Break | ASTM D638 | MPa | 50.7 |
| Tensile Modulus | ASTM D638 | MPa | 1849 |
| Flexural Modulus | ASTM D790 | MPa | 2078 |
| Flexural Strength | ASTM D790 | MPa | 98.9 |
| Notched Izod at 23° C. | ASTM D256 | KJ/m$^2$ | 81.6 |
| HDT at | ASTM D648 | ° C. | |
| 0.45 MPa | | | 124 |
| 1.82 MPa | | | |

This composition did not prove to have adequate flame retardancy and its tensile strength at yield was low.

EXAMPLE 7

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 92.35 parts of polycarbonate, 7 parts of FP-500 1,3-phenylene-bis (dixylenyl phosphate) from Amfine Chemical Corporation, 0.2 parts of Polyflon PTFE L-2 from Daikin, 0.24 parts of ELC-1010 tetrakis methylene (3,5-di-t-butyl-4-hydroxyhydrocinnamate)methane from Ed-Lynn Network Polymers, and 0.20 parts of Doverphos® S-9228 bis(2,4-dicumylphenyl)pentaerythritol diphosphite stabilizer. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 7.

TABLE 7

| Properties | Test Method | Units | Example 7 |
|---|---|---|---|
| Strain at Break | ASTM D638 | % | 78 |
| Tensile Strength at yield | ASTM D638 | MPa | 66.7 |
| Tensile Strength at Break | ASTM D638 | MPa | 62.7 |
| Tensile Modulus | ASTM D638 | MPa | 1900 |
| Flexural Modulus | ASTM D790 | MPa | 2834 |
| Flexural Strength | ASTM D790 | MPa | 105.7 |
| Notched Izod at 23° C. | ASTM D256 | KJ/m$^2$ | 8.1 |
| HDT at | ASTM D648 | ° C. | |
| 0.45 MPa | | | 121 |
| 1.82 MPa | | | |

EXAMPLE 8

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 91.35 parts of polycarbonate, 7 parts of FP-500 1,3-phenylene-bis (dixylenyl phosphate) from Amfine Chemical Corporation, 1 part of Silquest A-186 silane beta-(3,4-epoxycyclohexyl) ethyltrimethoxysilane from GE Silicones, 0.2 parts of Polyflon PTFE L-2 from Daikin, 0.24 parts of ELC-1010 tetrakis methylene (3,5-di-t-butyl-4-hydroxyhydrocinnamate)methane from Ed-Lynn Network Polymers, and 0.20 parts of Doverphos® S-9228 bis(2,4-dicumylphenyl)pentaerythritol diphosphite stabilizer. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 8.

TABLE 8

| Properties | Test Method | Units | Example 8 |
|---|---|---|---|
| Strain at Break | ASTM D638 | % | 33 |
| Tensile Strength at yield | ASTM D638 | MPa | 68.1 |
| Tensile Strength at Break | ASTM D638 | MPa | 51.4 |
| Tensile Modulus | ASTM D638 | MPa | 2004 |
| Flexural Modulus | ASTM D790 | MPa | 2668 |
| Flexural Strength | ASTM D790 | MPa | 102.5 |

TABLE 8-continued

| Properties | Test Method | Units | Example 8 |
|---|---|---|---|
| Notched Izod at 23° C. | ASTM D256 | KJ/m$^2$ | 6.9 |
| HDT at | ASTM D648 | ° C. | |
| 0.45 MPa | | | 115 |
| 1.82 MPa | | | |

EXAMPLE 9

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 92.35 parts of polycarbonate, 7 parts of Reophos BAPP bisphenol A diphenylphosphate from Great Lakes, 0.2 parts of Polyflon PTFE L-2 from Daikin, 0.24 parts of ELC-1010 tetrakis methylene (3,5-di-t-butyl-4-hydroxyhydrocinnamate)methane from Ed-Lynn Network Polymers, and 0.20 parts of Doverphos® S-9228 bis(2,4-dicumylphenyl) pentaerythritol diphosphite stabilizer. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 9.

TABLE 9

| Properties | Test Method | Units | Example 9 |
|---|---|---|---|
| Strain at Break | ASTM D638 | % | 93 |
| Tensile Strength at yield | ASTM D638 | MPa | 68.0 |
| Tensile Strength at Break | ASTM D638 | MPa | 68.0 |
| Tensile Modulus | ASTM D638 | MPa | 2042 |
| Flexural Modulus | ASTM D790 | MPa | 2612 |
| Flexural Strength | ASTM D790 | MPa | 103.5 |
| Notched Izod at 23° C. | ASTM D256 | KJ/m$^2$ | 8.1 |
| HDT at | ASTM D648 | ° C. | |
| 0.45 MPa | | | 118 |
| 1.82 MPa | | | |
| Flammability rating | UL94 (0.059 in) | — | V0 |

EXAMPLE 10

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 92.35 parts of polycarbonate, 7 parts of Reophos RDP resorcinol diphenylphosphate from Great Lakes, 0.2 parts of Polyflon PTFE L-2 from Daikin, 0.24 parts of ELC-1010 tetrakis methylene (3,5-di-t-butyl-4-hydroxyhydrocinnamate)methane from Ed-Lynn Network Polymers, and 0.20 parts of Doverphos® S-9228 bis(2,4-dicumylphenyl) pentaerythritol diphosphite stabilizer. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 10.

TABLE 10

| Properties | Test Method | Units | Example 10 |
| --- | --- | --- | --- |
| Strain at Break | ASTM D638 | % | 85 |
| Tensile Strength at yield | ASTM D638 | MPa | 66.4 |
| Tensile Strength at Break | ASTM D638 | MPa | 66.4 |
| Tensile Modulus | ASTM D638 | MPa | 2098 |
| Flexural Modulus | ASTM D790 | MPa | 2634 |
| Flexural Strength | ASTM D790 | MPa | 104.3 |
| Notched Izod at 23° C. | ASTM D256 | KJ/m$^2$ | 6.9 |
| HDT at | ASTM D648 | ° C. | |
| 0.45 MPa | | | 114 |
| 1.82 MPa | | | |

EXAMPLE 11

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 80.10 parts of polycarbonate, 7 parts of Reophos BAPP bisphenol A diphenylphosphate from Great Lakes, 0.75 parts of Lotader® 8900 terpolymer of ethylene, methyl methacrylate and glycidyl methacrylate, 1.5 parts of Nitrimpact® 1300 methylmethacrylate-butadiene-styrene based rubbery modifier, 0.2 parts of Polyflon PTFE L-2 from Daikin, 0.24 parts of ELC-1010 tetrakis methylene (3,5-di-t-butyl-4-hydroxyhydrocinnamate)methane from Ed-Lynn Network Polymers, and 0.20 parts of Doverphos® S-9228 bis(2,4-dicumylphenyl)pentaerythritol diphosphite stabilizer. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 16.

TABLE 11

| Properties | Test Method | Units | Example 11 |
| --- | --- | --- | --- |
| Strain at Break | ASTM D638 | % | 18.6 |
| Tensile Strength at yield | ASTM D638 | MPa | 58.9 |
| Tensile Strength at Break | ASTM D638 | MPa | 43.5 |
| Tensile Modulus | ASTM D638 | MPa | 1614 |
| Flexural Modulus | ASTM D790 | MPa | 2299 |
| Flexural Strength | ASTM D790 | MPa | 88 |
| Notched Izod at 23° C. | ASTM D256 | KJ/m$^2$ | 76.7 |
| HDT at | ASTM D648 | ° C. | |
| 0.45 MPa | | | 118 |
| 1.82 MPa | | | |
| Flammability rating | UL94 (0.059 in) | — | V0 |

EXAMPLE 12

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 90.60 parts of polycarbonate, 5 parts of FP-500 1,3-phenylene-bis (dixylenyl phosphate) from Amfine Chemical Corporation, 0.75 parts of Lotader® 8900 terpolymer of ethylene, methyl methacrylate and glycidyl methacrylate, 1.5 parts of Nitrimpact® 1300 methylmethacrylate-butadiene-styrene based rubbery modifier, 1 parts of Cloisite® 30B orhanic modified clay from Southern Clay Inc., 0.5 part of Silquest A-186 silane beta-(3,4-epoxycyclohexyl)ethyltrimethoxysilane from GE Silicones, 0.2 parts of Polyflon PTFE L-2 from Daikin, 0.24 parts of ELC-1010 tetrakis methylene (3,5-di-t-butyl-4-hydroxyhydrocinnamate)methane from Ed-Lynn Network Polymers, and 0.20 parts of Doverphos®V S-9228 bis(2,4-dicumylphenyl)pentaerythritol diphosphite stabilizer. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 12.

TABLE 12

| Properties | Test Method | Units | Example 12 |
| --- | --- | --- | --- |
| Strain at Break | ASTM D638 | % | 34.3 |
| Tensile Strength at yield | ASTM D638 | MPa | 65.4 |
| Tensile Strength at Break | ASTM D638 | MPa | 62.6 |
| Tensile Modulus | ASTM D638 | MPa | 1981 |
| Flexural Modulus | ASTM D790 | MPa | 2505 |
| Flexural Strength | ASTM D790 | MPa | 97.3 |
| Notched Izod at 23° C. | ASTM D256 | KJ/m$^2$ | 13.2 |
| HDT at | ASTM D648 | ° C. | |
| 0.45 MPa | | | 121 |
| 1.82 MPa | | | |

The presence of clay in this composition destroyed impact strength. Accordingly, this experiment shows that the flame retardant compositions of this invention should not be filled with clay.

EXAMPLE 13

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 88.60 parts of polycarbonate, 7 parts of FP-500 1,3-phenylene-bis (dixylenyl phosphate) from Amfine Chemical Corporation, 0.75 parts of Lotader® 8900 terpolymer of ethylene, methyl methacrylate and glycidyl methacrylate, 1.5 parts of Nitrimpact® 1300 methylmethacrylate-butadiene-styrene based rubbery modifier, 1 parts of Cloisite®30B orhanic modified clay from Southern Clay Inc., 0.5 part of Silquest A-186 silane beta-(3,4-epoxycyclohexyl)ethyltrimethoxysilane from GE Silicones, 0.2 parts of Polyflon PTFE L-2 from Daikin, 0.24 parts of ELC-1010 tetrakis methylene (3,5-di-t-butyl-4-hydroxyhydrocinnamate)methane from Ed-Lynn Network Polymers, and 0.20 parts of Doverphos® S-9228 bis(2,4-dicumylphenyl)pentaerythritol diphosphite stabilizer. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 13.

TABLE 13

| Properties | Test Method | Units | Example 13 |
|---|---|---|---|
| Strain at Break | ASTM D638 | % | 74.4 |
| Tensile Strength at yield | ASTM D638 | MPa | 66.1 |
| Tensile Strength at Break | ASTM D638 | MPa | 69.4 |
| Tensile Modulus | ASTM D638 | MPa | 1996 |
| Flexural Modulus | ASTM D790 | MPa | 2545 |
| Flexural Strength | ASTM D790 | MPa | 97.6 |
| Notched Izod at 23° C. | ASTM D256 | KJ/m$^2$ | 10.2 |
| HDT at | ASTM D648 | ° C. | |
| 0.45 MPa | | | 116 |
| 1.82 MPa | | | |
| Flammability rating | UL94 (0.059 in) | — | V0 |

The presence of clay in this composition destroyed impact strength. Accordingly, this experiment shows that the flame retardant compositions of this invention should not be filled with clay.

EXAMPLE 14

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 89.60 parts of polycarbonate, 7 parts of FP-500 1,3-phenylene-bis(dixylenyl phosphate) from Amfine Chemical Corporation, 0.75 parts of Lotader® 8900 terpolymer of ethylene, methyl methacrylate and glycidyl methacrylate, 1.5 parts of Nitrimpact® 1300 methylmethacrylate-butadiene-styrene based rubbery modifier, 0.5 part of Silquest A-186 silane beta-(3,4-epoxycyclohexyl)ethyltrimethoxysilane from GE Silicones, 0.2 parts of Polyflon PTFE L-2 from Daikin, 0.24 parts of ELC-1010 tetrakis methylene (3,5-di-t-butyl-4-hydroxyhydrocinnamate)methane from Ed-Lynn Network Polymers, and 0.20 parts of Doverphos® S-9228 bis(2,4-dicumylphenyl)pentaerythritol diphosphite stabilizer. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 14.

TABLE 14

| Properties | Test Method | Units | Example 14 |
|---|---|---|---|
| Strain at Break | ASTM D638 | % | 46.6 |
| Tensile Strength at yield | ASTM D638 | MPa | 63.5 |
| Tensile Strength at Break | ASTM D638 | MPa | 51.1 |
| Tensile Modulus | ASTM D638 | MPa | 1840 |
| Flexural Modulus | ASTM D790 | MPa | 2425 |
| Flexural Strength | ASTM D790 | MPa | 95.1 |
| Notched Izod at 23° C. | ASTM D256 | KJ/m$^2$ | 20.9 |
| HDT at | ASTM D648 | ° C. | |
| 0.45 MPa | | | 114 |
| 1.82 MPa | | | |
| Flammability rating | UL94 (0.059 in) | — | V0 |

EXAMPLE 15

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 80.10 parts of polycarbonate, 7 parts of FP-500 1,3-phenylene-bis(dixylenyl phosphate) from Amfine Chemical Corporation, 0.75 parts of Lotader® 8900 terpolymer of ethylene, methyl methacrylate and glycidyl methacrylate, 1.5 parts of Nitrimpact® 1300 methylmethacrylate-butadiene-styrene based rubbery modifier, 0.2 parts of Polyflon PTFE L-2 from Daikin, 0.24 parts of ELC-1010 tetrakis methylene (3,5-di-t-butyl-4-hydroxyhydrocinnamate)methane from Ed-Lynn Network Polymers, and 0.20 parts of Doverphos® S-9228 bis(2,4-dicumylphenyl)pentaerythritol diphosphite stabilizer. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 15.

TABLE 15

| Properties | Test Method | Units | Example 15 |
|---|---|---|---|
| Strain at Break | ASTM D638 | % | 79.5 |
| Tensile Strength at yield | ASTM D638 | MPa | 65.2 |
| Tensile Strength at Break | ASTM D638 | MPa | 61.4 |
| Tensile Modulus | ASTM D638 | MPa | 1903 |
| Flexural Modulus | ASTM D790 | MPa | 2438 |
| Flexural Strength | ASTM D790 | MPa | 94.5 |
| Notched Izod at 23° C. | ASTM D256 | KJ/m$^2$ | 17.7 |
| HDT at | ASTM D648 | ° C. | |
| 0.45 MPa | | | 117 |
| 1.82 MPa | | | |

EXAMPLE 16

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 87.55 parts of polycarbonate, 1.25 parts of Lotader® 8900 terpolymer of ethylene, methyl methacrylate and glycidyl methacrylate, 2.00 parts of Nitrimpact® 1300 methylmethacrylate-butadiene-styrene based rubbery modifier, 0.2 parts of Polyflon PTFE L-2 from Daikin, 0.24 parts of ELC-1010 tetrakis methylene (3,5-di-t-butyl-4-hydroxyhydrocinnamate)methane from Ed-Lynn Network Polymers, and 0.20 parts of ELC® 626 a mixture of bis(2,4-di-tert-butylphenyl)pentaerythritol diphosphine (90-99%) and 1,1',1"-nitrilotripropane-2-ol (0.5-1%) from Ed-Lynn Network Polymers. At Zone 4 of the extruder at a distance from the main feed-hopper of 20-25 diameters, 8 parts of Reophos BAPP bisphenol A diphenylphosphate from Great Lakes was added through a side feeder. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 16.

TABLE 16

| Properties | Test Method | Units | Example 16 |
|---|---|---|---|
| Strain at Break | ASTM D638 | % | 83.2 |
| Tensile Strength at yield | ASTM D638 | MPa | 65.7 |
| Tensile Strength at Break | ASTM D638 | MPa | 65.5 |
| Tensile Modulus | ASTM D638 | MPa | 2043 |
| Flexural Modulus | ASTM D790 | MPa | 2805 |
| Flexural Strength | ASTM D790 | MPa | 106.9 |
| Notched Izod at 23° C. | ASTM D256 | KJ/m$^2$ | 87.3 |
| HDT at | ASTM D648 | ° C. | |
| 0.45 MPa | | | 117 |
| 1.82 MPa | | | 103 |
| Flammability rating | UL94 (0.059 in) | — | V0 |

EXAMPLE 17

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 81.05 parts of polycarbonate, 1 parts of Lotader® 8900 terpolymer of ethylene, methyl methacrylate and glycidyl methacrylate, 1.75 parts of Nitrimpact® 1300 methylmethacrylate-butadiene-styrene based rubbery modifier, 0.2 parts of Polyflon PTFE L-2 from Daikin, 0.24 parts of ELC-1010 tetrakis methylene (3,5-di-t-butyl-4-hydroxyhydrocinnamate)methane from Ed-Lynn Network Polymers, and 0.20 parts of ELC®G 626 a mixture of bis(2,4-di-tert-butylphenyl)pentaerythritol diphosphine (90-99%) and 1,1',1"-nitrilotripropane-2-ol (0.5-1%) from Ed-Lynn Network Polymers. At Zone 4 of the extruder at a distance from the main feedhopper of 20-25 diameters, 14 parts of Reophos BAPP bisphenol A diphenylphosphate from Great Lakes was added through a side feeder. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 17.

TABLE 17

| Properties | Test Method | Units | Example 17 |
|---|---|---|---|
| Strain at Break | ASTM D638 | % | 41.2 |
| Tensile Strength at yield | ASTM D638 | MPa | 68.9 |
| Tensile Strength at Break | ASTM D638 | MPa | 51.4 |
| Tensile Modulus | ASTM D638 | MPa | 1693 |
| Flexural Modulus | ASTM D790 | MPa | 2541 |
| Flexural Strength | ASTM D790 | MPa | 101.6 |
| Notched Izod at 23° C. | ASTM D256 | KJ/m$^2$ | 10.9 |
| HDT at | ASTM D648 | ° C. | |
| 0.45 MPa | | | Not determined |
| 1.82 MPa | | | 97 |
| Flammability rating | UL94 (0.059 in) | — | V0 |

COMPARATIVE EXAMPLE 18

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 87.55 parts of polycarbonate, 8 parts of Fyroflex®BDP bisphenol A diphenylphosphate from Akzo Nobel, 3.25 parts of Lotader® 8900 terpolymer of ethylene, methyl methacrylate and glycidyl methacrylate, 0.2 parts of Polyflon PTFE L-2 from Daikin, 0.24 parts of ELC-1010 tetrakis methylene (3,5-di-t-butyl-4-hydroxyhydrocinnamate)methane from Ed-Lynn Network Polymers, and 0.20 parts of ELC® 626 a mixture of bis(2,4-di-tert-butylphenyl)pentaerythritol diphosphine (90-99%) and 1,1',1"-nitrilotripropane-2-ol (0.5-1%) from Ed-Lynn Network Polymers. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 18.

TABLE 18

| Properties | Test Method | Units | Example 18 |
|---|---|---|---|
| Strain at Break | ASTM D638 | % | 59.4 |
| Tensile Strength at yield | ASTM D638 | MPa | 62.7 |
| Tensile Strength at Break | ASTM D638 | MPa | 53.9 |
| Tensile Modulus | ASTM D638 | MPa | 2021 |
| Flexural Modulus | ASTM D790 | MPa | 2411 |
| Flexural Strength | ASTM D790 | MPa | 93.2 |
| Notched Izod at 23° C. | ASTM D256 | KJ/m$^2$ | 70.4 |
| HDT at | ASTM D648 | ° C. | |
| 0.45 MPa | | | |
| 1.82 MPa | | | 96 |
| Flammability rating | UL94 (0.059 in) | — | V0 |

As can be seen, the physical properties of the polymer composition made in this experiment were inferior to the properties of the polymer composition made in Example 16. More specifically, the composition made in this experiment exhibited lower strength and impact characteristics. It also had a lower heat distortion temperature than did the composition made in Example 16. More specifically, the HDT attained in this experiment was only 96° C. which is severely compromised compared to the HDT of 103° C. attained in Example 16. This experiment shows the importance of including both a functionalized acrylic polymer and an alkyl methacrylate-diene-vinyl aromatic terpolymer in the flame retardant polycarbonate composition. In this experiment where only Lotader® 8900 terpolymer of ethylene, methyl methacrylate and glycidyl methacrylate was used as the impact modifier, properties were compromised with respect to those attained in Example 16 where both Lotader®& 8900 terpolymer of ethylene, methyl methacrylate and glycidyl methacrylate and Nitrimpact® 1300 methylmethacrylate-butadiene-styrene based rubbery modifier were included as impact modifiers.

COMPARATIVE EXAMPLE 19

Through the main feeder of a ZSK 25 twin screw extruder (L/D=44) at a rate of 500 rpm and a set temperature profile of 25° C. (feed), 195° C. (Zone 2), 225° C. (Zone 3), 260° C. (Zone 4), 260° C. (Zone 5), 260° C. (Zone 6), 260° C. (Zone 7), 260° C. (Zone 8), 260° C. (Zone 9), 240° C. (Zone 10), 240° C. (Zone 11), 240° C. (die), were charged 87.55 parts of polycarbonate, 8 parts of Fyroflex®BDP bisphenol A diphenylphosphate from Great Lakes, 3.25 parts of Nitrimpact® 1300 methylmethacrylate-butadiene-styrene based rubbery modifier, 0.2 parts of Polyflon PTFE L-2 from Daikin, 0.24 parts of ELC-1010 tetrakis methylene (3,5-di-t-butyl-4-hydroxyhydrocinnamate)methane from Ed-Lynn Network Polymers, and 0.20 parts of ELC® 626 a mixture of bis(2,4-di-tert-butylphenyl)pentaerythritol diphosphine (90-99%) and 1,1',1"-nitrilotripropane-2-ol (0.5-1%) from Ed-Lynn Network Polymers. The product was pelletized and dried at 100° C. for 4 hours to a moisture content of less than 0.05% by weight. Then, test specimens were made by injection molding and were allowed to condition at a temperature of 23° C. for at least 4 hours before testing. The properties of the polycarbonate composition made in this experiment are summarized in Table 19.

TABLE 19

| Properties | Test Method | Units | Example 19 |
| --- | --- | --- | --- |
| Strain at Break | ASTM D638 | % | 56.0 |
| Tensile Strength at yield | ASTM D638 | MPa | 65.9 |
| Tensile Strength at Break | ASTM D638 | MPa | 53.2 |
| Tensile Modulus | ASTM D638 | MPa | 2193 |
| Flexural Modulus | ASTM D790 | MPa | 2790 |
| Flexural Strength | ASTM D790 | MPa | 103.0 |
| Notched Izod at 23° C. | ASTM D256 | $KJ/m^2$ | 27.4 |
| HDT at | ASTM D648 | ° C. | |
| 0.45 MPa | | | |
| 1.82 MPa | | | 93 |
| Flammability rating | UL94 (0.059 in) | — | V0 |

As can be seen, the physical properties of the polymer composition made in this experiment were inferior to the properties of the polymer composition made in Example 16. More specifically, the composition made in this experiment exhibited unacceptably low impact resistance characteristics. In fact, the notched Izod impact strength attained in this experiment was only 27.4 $KJ/m^2$ as compared to the very good notched Izod impact strength of 87.3 $KJ/m^2$ attained in Example 16. It also had a lower heat distortion temperature than did the composition made in Example 16. This experiment shows the importance of including both a functionalized acrylic polymer and an alkyl methacrylate-diene-vinyl aromatic terpolymer in the flame retardant polycarbonate composition. In this experiment where only Nitrimpact® 1300 methylmethacrylate-butadiene-styrene based rubbery modifier was used as the impact modifier, properties were significantly compromised with respect to those attained in Example 16 where both Lotader® 8900 terpolymer of ethylene, methyl methacrylate and glycidyl methacrylate and Nitrimpact® 1300 methylmethacrylate-butadiene-styrene based rubbery modifier were included as impact modifiers.

While certain representative embodiments and details have been shown for the purpose of illustrating the subject invention, it will be apparent to those skilled in this art that various changes and modifications can be made therein without departing from the scope of the subject invention.

What is claimed is:

1. A flame retardant polycarbonate composition which is comprised of (1) a polycarbonate, (2) a phosphoric acid ester, (3) a functionalized acrylic polymer, wherein the functionalized acrylic polymer is comprised of repeat units that are derived from about 45 weight percent to about 89 weight percent ethylene, 10 weight percent to 40 weight percent methylmethacrylate, and 1 weight percent to 15 weight percent glycidyl methacrylate, (4) an alkyl methacrylate-diene-vinyl aromatic terpolymer, and (5) an anti-dripping agent, wherein the polycarbonate is present in the composition in an amount of at least about 85 weight percent, wherein the phosphoric acid ester is present at a level which is within the range of about 1 weight percent to about 12 weight percent, wherein the functionalized acrylic polymer is present at a level which is within the range of about 0.5 weight percent to about 4.5 weight percent, and wherein the alkyl methacrylate-diene-vinyl aromatic terpolymer is present at a level which is within the range of about 0.5 weight percent to about 4.5 weight percent, with the proviso that the sum of the amount of the functionalized acrylic acid polymer and the alkyl methacrylate-diene-vinyl aromatic terpolymer present in the composition does not total more than 5 weight percent.

2. A flame retardant polycarbonate composition as specified in claim 1 wherein the functionalized acrylic polymer is comprised of repeat units that are derived from 60 weight percent to 74 weight percent ethylene, 20 weight percent of 30 weight percent methylmethacrylate, and 6 weight percent to 10 weight percent glycidyl methacrylate.

3. A flame retardant polycarbonate composition as specified in claim 2 wherein the alkyl methacrylate-diene-vinyl aromatic terpolymer is comprised of repeat units that are derived from 1,3-butadiene, styrene, and methyl methacrylate.

4. A flame retardant polycarbonate composition as specified in claim 3 wherein the phosphoric acid ester is present at a level which is within the range of 2 weight percent to 10 weight percent.

5. A flame retardant polycarbonate composition as specified in claim 4 wherein the functionalized acrylic polymer is present at a level which is within the range of 1 weight percent to 2 weight percent.

6. A flame retardant polycarbonate composition as specified in claim 4 wherein the alkyl methacrylate-diene-vinyl aromatic terpolymer is present at a level which is within the range of 2 weight percent to 3 weight percent.

7. A flame retardant polycarbonate composition as specified in claim 1 wherein the functionalized acrylic polymer and the alkyl methacrylate-diene-vinyl aromatic terpolymer are dispersed into said composition under dynamic reaction conditions.

8. A flame retardant polycarbonate composition as specified in claim 3 wherein the phosphoric acid ester is present at a level which is within the range of 5 weight percent to 9 weight percent.

9. A flame retardant polycarbonate composition as specified in claim 3 wherein the flame retardant polycarbonate composition is comprised of an anti-dripping agent.

10. A flame retardant polycarbonate composition as specified in claim 1 wherein the phosphoric acid ester is aromatic phosphate oligomer.

11. A flame retardant polycarbonate composition as specified in claim 10 wherein the aromatic phosphate oligomer is bisphenol A diphenylphosphate.

12. A flame retardant polycarbonate composition as specified in claim 10 wherein the aromatic phosphate oligomer is resorcinol diphenylphosphate.

13. A flame retardant polycarbonate composition as specified in claim 10 wherein the aromatic phosphate oligomer is 1,3-phenylene-bis (dixylenyl phosphate).

14. A flame retardant polycarbonate composition as specified in claim 9 wherein the anti-dripping agent is present at a level within the range of 0.05 to 0.5 weight percent.

15. A flame retardant polycarbonate composition as specified in claim 9 wherein the anti-dripping agent is present at a level within the range of 0.1 to 0.3 weight percent.

16. A flame retardant polycarbonate composition as specified in claim 14 wherein the anti-dripping agent is poly(tetrafluoroethylene).

17. A flame retardant polycarbonate composition as specified in claim 1 wherein said composition is void of clay.

18. A flame retardant polycarbonate composition as specified in claim 4 wherein the alkyl methacrylate-diene-vinyl aromatic terpolymer is a block copolymer which contains 5 to 25 weight percent styrene repeat units, 50 to 90 weight percent butadiene repeat units and 5 to 25 weight percent methylmethacrylate repeat units.

19. A flame retardant polycarbonate composition as specified in claim 18 wherein the phosphoric acid ester is present at a level which is within the range of 2 weight percent to 10 weight percent, wherein the functionalized acrylic polymer is present at a level which is within the range of 1 weight percent to 2 weight percent, wherein the alkyl methacrylate-diene-vinyl aromatic terpolymer is present at a level which is within the range of 2 weight percent to 3 weight percent, wherein the flame retardant polycarbonate composition is comprised of an anti-dripping agent, and wherein the anti-dripping agent is present at a level within the range of 0.05 to 0.5 weight percent.

* * * * *